United States Patent
Clemen

(10) Patent No.: US 9,696,036 B2
(45) Date of Patent: Jul. 4, 2017

(54) GAS TURBINE COMBUSTION CHAMBER TILE HAVING EFFUSION COOLING HOLES INCLUDING STRAIGHT AND OFFSET SECTIONS

(71) Applicant: Rolls-Royce Deutschland Ltd & Co KG, Blankenfelde-Mahlow (DE)

(72) Inventor: Carsten Clemen, Mittenwalde (DE)

(73) Assignee: ROLLS-ROYCE DEUTSCHLAND LTD & CO KG, Blankenfel, De-Mahlow (DE)

( * ) Notice: Subject to any disclaimer, the term of this patent is extended or adjusted under 35 U.S.C. 154(b) by 545 days.

(21) Appl. No.: 14/304,367

(22) Filed: Jun. 13, 2014

(65) Prior Publication Data
US 2015/0027127 A1    Jan. 29, 2015

(30) Foreign Application Priority Data
Jul. 24, 2013    (DE) ........................ 10 2013 214 487

(51) Int. Cl.
*F23R 3/06*    (2006.01)
*F23R 3/00*    (2006.01)
*F23R 3/10*    (2006.01)

(52) U.S. Cl.
CPC ............. *F23R 3/002* (2013.01); *F23R 3/007* (2013.01); *F23R 3/06* (2013.01); *B23P 2700/06* (2013.01); *B23P 2700/13* (2013.01); *F23R 3/10* (2013.01); *F23R 2900/00018* (2013.01); *F23R 2900/03041* (2013.01)

(58) Field of Classification Search
CPC .. F23R 3/002; F23R 3/06; F23R 2900/03041; F23R 2900/00018; F23R 3/04; F23R 3/10
See application file for complete search history.

(56) References Cited

U.S. PATENT DOCUMENTS

| 4,004,056 A | 1/1977 | Carroll |
| 4,743,462 A | 5/1988 | Radzavich et al. |
| 5,223,320 A * | 6/1993 | Richardson ............. B32B 3/266 |
| | | 156/252 |

(Continued)

FOREIGN PATENT DOCUMENTS

| CA | 2282010 A1 | 3/2000 |
| DE | 2628529 A1 | 2/1977 |

(Continued)

OTHER PUBLICATIONS

German Search Report dated Feb. 27, 2014 from counterpart app No. 10 2013 214 487.3.

(Continued)

*Primary Examiner* — William H Rodriguez
(74) *Attorney, Agent, or Firm* — Shuttleworth & Ingersoll, PLC; Timothy J. Klima

(57) ABSTRACT

The present invention relates to a combustion chamber tile of a gas turbine with a plate-like basic element which is provided with at least one effusion cooling hole extending through the basic element from a surface of one side to the other side, with the effusion cooling hole being designed, from the one side of the basic element and beginning from an inlet opening, substantially at right angles to the surface over part of its length, wherein the effusion cooling hole inside the basic element has a straight section and is then provided with an offset section.

6 Claims, 5 Drawing Sheets

(56) References Cited

U.S. PATENT DOCUMENTS

Figure 1:
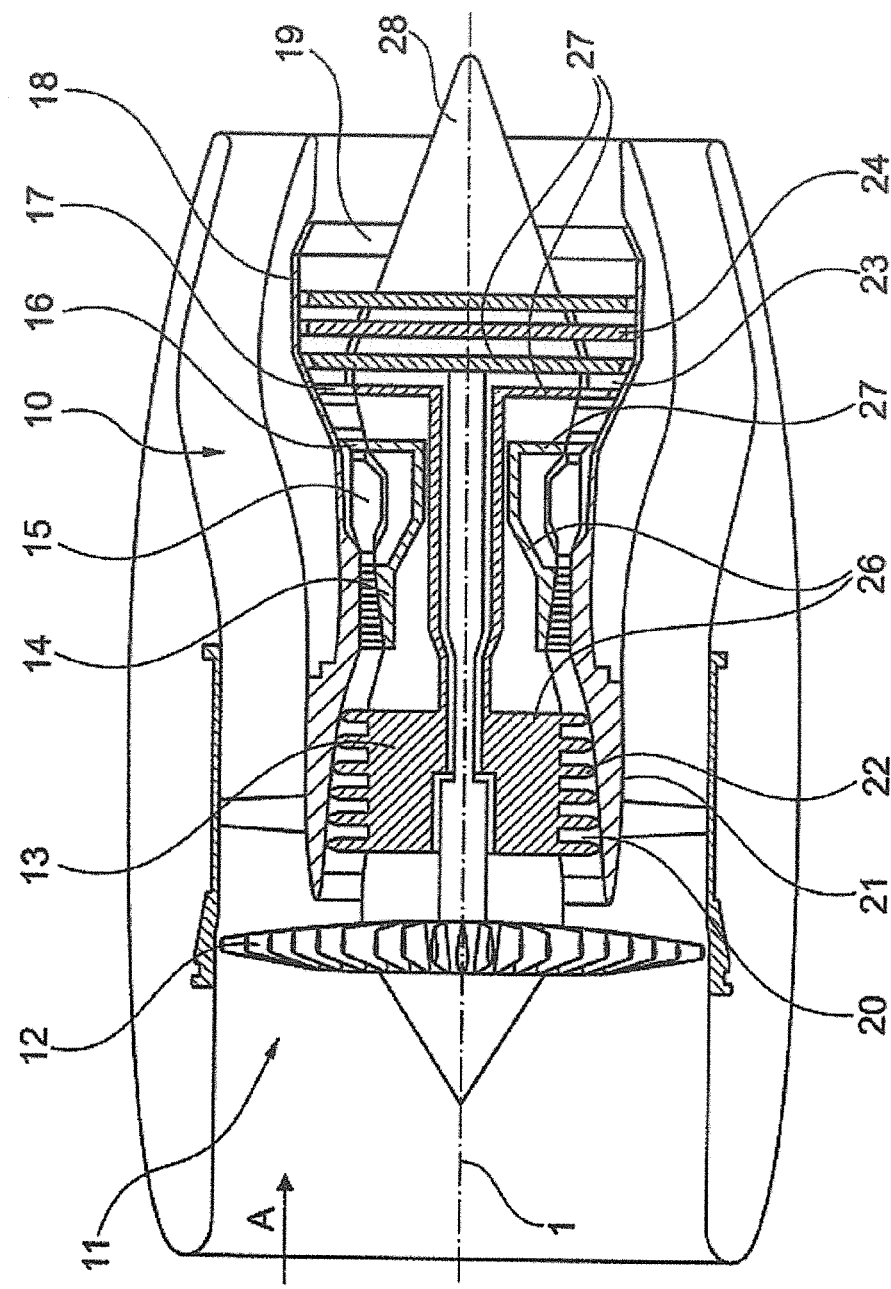

| | | | |
|---|---|---|---|
| 5,941,686 A | 8/1999 | Gupta et al. | |
| 6,383,602 B1* | 5/2002 | Fric | F01D 5/186 |
| | | | 415/115 |
| 6,627,019 B2* | 9/2003 | Jarmon | C04B 35/806 |
| | | | 156/155 |
| 7,464,554 B2 | 12/2008 | Cheung et al. | |
| 7,658,590 B1 | 2/2010 | Spanks | |
| 7,744,348 B2 | 6/2010 | Bezencon et al. | |
| 7,820,267 B2 | 10/2010 | Fahndrich | |
| 2009/0142548 A1 | 6/2009 | Patterson et al. | |
| 2012/0076644 A1 | 3/2012 | Zuniga et al. | |
| 2012/0094029 A1 | 4/2012 | Halberstadt et al. | |
| 2013/0205790 A1* | 8/2013 | Xu | F01D 5/186 |
| | | | 60/754 |
| 2013/0205792 A1* | 8/2013 | Gleiner | F23R 3/06 |
| | | | 60/754 |
| 2013/0269354 A1* | 10/2013 | Starkweather | F23R 3/06 |
| | | | 60/754 |
| 2014/0271229 A1* | 9/2014 | Nita | F01D 5/186 |
| | | | 416/97 R |
| 2015/0377033 A1* | 12/2015 | Xu | F01D 11/08 |
| | | | 60/755 |
| 2016/0008889 A1* | 1/2016 | Xu | F01D 5/186 |
| | | | 219/76.12 |
| 2016/0097285 A1* | 4/2016 | Harding | F01D 5/186 |
| | | | 60/752 |
| 2016/0097325 A1* | 4/2016 | Harding | F01D 5/186 |
| | | | 60/752 |
| 2016/0123156 A1* | 5/2016 | Hucker | F01D 5/186 |
| | | | 60/806 |
| 2016/0123592 A1* | 5/2016 | Drake | F23R 3/005 |
| | | | 60/752 |

FOREIGN PATENT DOCUMENTS

| | | |
|---|---|---|
| DE | 4116886 A1 | 12/1991 |
| EP | 0985802 A1 | 3/2000 |
| EP | 1635119 | 3/2006 |
| EP | 1887107 | 2/2008 |
| JP | 6032903 A | 2/1985 |
| JP | 08135401 A | 5/1996 |
| JP | 2006307842 A | 11/2006 |
| WO | 2006/069941 | 7/2006 |
| WO | 2006069941 A1 | 7/2006 |

OTHER PUBLICATIONS

European Search Report dated Dec. 3, 2014 from counterpart App No. 14169856.3.

* cited by examiner

State of the art

State of the art

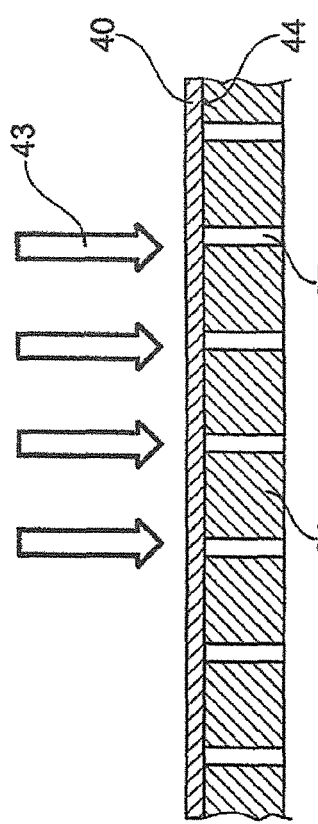
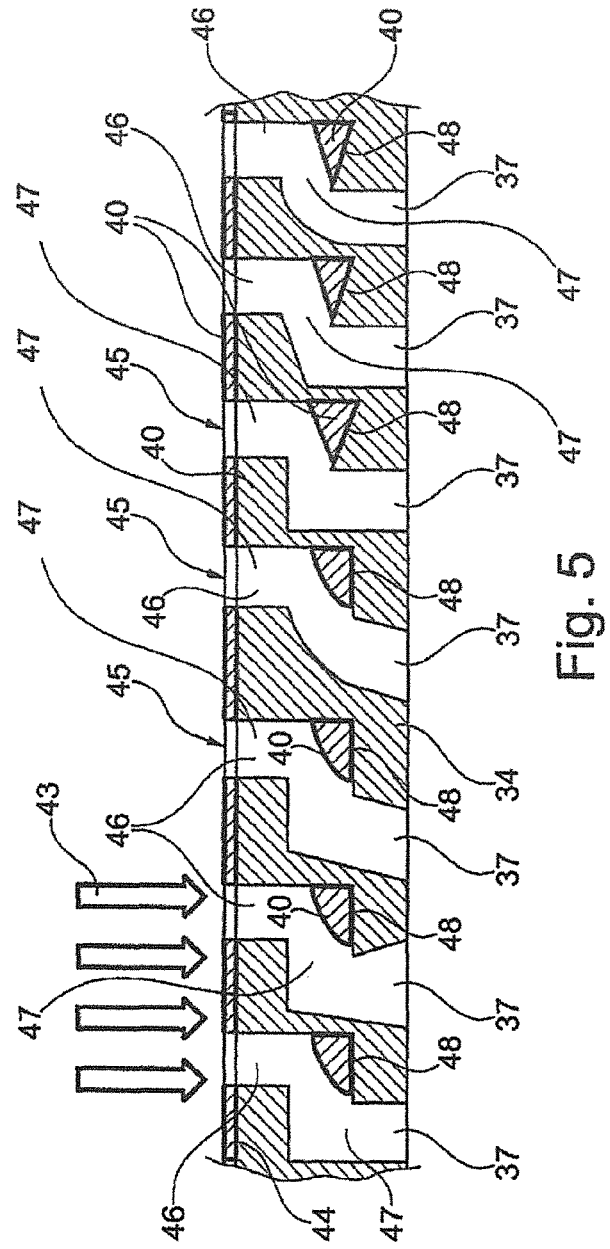

GAS TURBINE COMBUSTION CHAMBER TILE HAVING EFFUSION COOLING HOLES INCLUDING STRAIGHT AND OFFSET SECTIONS

This application claims priority to German Patent Application DE102013214487.3 filed Jul. 24, 2013 the entirety of which is incorporated by reference herein.

This invention relates to a combustion chamber tile of a gas turbine in accordance with the features described herein.

In detail, the invention relates to a combustion chamber the with a plate-like basic element which is provided with at least one effusion cooling hole extending through the basic element from a surface of one side to the other side, with the effusion cooling hole being designed, from the one side of the basic element and beginning from an inlet opening, substantially at right angles to the surface over part of its length.

Combustion chamber tiles are characterized by the fact that they have an arbitrary number (very high, often in the thousands) of effusion cooling holes on the side facing the combustion chamber. These effusion cooling holes are used to cool the tile against the high temperatures in the combustion chamber. Moreover, at least one mixing air hole is located on the combustion chamber tile and is used to pass air from the space (annulus) surrounding the combustion chamber on the outside into the combustion chamber, for the purpose of cooling the combustion and making it lean, thereby reducing the amount of NOx generated in the combustion chamber. In addition to cooling by the effusion cooling holes, the tiles are provided with a ceramic coating acting as an insulating layer against the high temperatures in the combustion chamber. The ceramic coating is sprayed here onto that side of the tile facing the combustion chamber. The effusion cooling holes are here frequently designed perpendicular to the surface of the combustion chamber tile.

When coating the combustion chamber tile with a ceramic coating, there are generally speaking two possibilities: one of these is to coat the tile before the effusion cooling holes are made in the tile. This means that the effusion cooling holes are drilled into the basic element of the tile after coating. That however leads to flaking off of the ceramic coating. In addition, it is necessary to form the effusion cooling holes by means of a drilling operation, which is very time-consuming and cost-intensive. An alternative is to initially provide the tile with the effusion cooling holes and to coat it subsequently. With this procedure, however, there is the problem that the effusion cooling holes are clogged and/or at least partially blocked by the coating compound. It is known from the state of the art, for example, to cover the effusion cooling hole before coating (U.S. Pat. No. 4,743,462 A) or to design the discharge area of the effusion cooling hole such that as little as possible of the coating material can enter. Solutions of this type are already known from US 2009/0142548 A1 or US 2012/0094029 A1 A similar solution is also shown by EP 0 985 802 A1.

The object underlying the present invention is to provide a combustion chamber tile of the type specified at the beginning which while being simply designed and easily and cost-effectively producible enables subsequent application of a coating without the risk of clogging the effusion cooling holes.

It is a particular object to provide a solution to the above problems by a combination of features described herein. Further advantageous embodiments will become apparent from the present disclosure.

It is thus provided in accordance with the invention that the effusion cooling hole inside the basic element of the combustion chamber tile initially has a straight section and is then provided with an offset section. The effusion cooling hole thus does not extend, as known in the state of the art, in a straight line through the combustion chamber tile. The state of the art shows straight effusion cooling holes which extend perpendicularly (normally) to the surface of the combustion chamber tile or at an angle thereto. These previously known effusion cooling holes are however always straight. By contrast, the embodiment in accordance with the invention has a marked offset provided in an area of the effusion cooling hole which is central relative to the overall length of the effusion cooling hole. It is particularly favourable here when the effusion cooling hole forms a shoulder opposite the inlet opening of the effusion cooling hole and in the area provided with the offset section. This shoulder forms a deposition surface on which coating material that has entered via the inlet opening can collect. The coating material thus passes through the initially straight section of the effusion cooling hole and then hits the offset area forming the shoulder already mentioned. There the coating material is deposited without any risk of the effusion cooling hole becoming clogged. The offset area or the shoulder formed thereby are dimensioned such that the coating material volume corresponding to the size of the inlet opening can be deposited there, without the cross-section of the effusion cooling hole becoming constricted or clogged.

In a favourable embodiment of the invention, it is provided that the shoulder extends substantially parallel to the surface of the basic element. This results in a deposition surface which is arranged opposite the inlet opening of the effusion cooling hole. In an alternative embodiment of the invention, it is also possible to design the shoulder inclined relative to the surface of the basic element in order to form a concave area. The concave area thus forms a collection space in which the coating material can accumulate. A collection space in which the coating material can be securely deposited is thus created in this area of the shoulder or of the offset section of the effusion cooling hole also due to the viscosity of the coating material and its surface tension.

In accordance with the invention, the effusion cooling holes thus have an offset section and a recess or a widening of their diameter at the offset. This results automatically due to the offset section of the effusion cooling hole. The volume quantity of the coating material sprayed into the inlet opening of the effusion cooling hole is thus deposited in the area of the offset or shoulder without the effusion cooling hole becoming clogged. The further section of the effusion cooling hole to the uncoated side of the combustion chamber tile can be designed arbitrarily. The section of the effusion cooling hole from the combustion chamber tile surface to be coated is preferably designed perpendicular to the surface.

The combustion chamber tile in accordance with the invention is preferably manufactured by means of a laser deposition method, in which a powdery material is melted on layer by layer using a laser. This makes it possible to create any required courses for effusion cooling holes.

Figure 2:
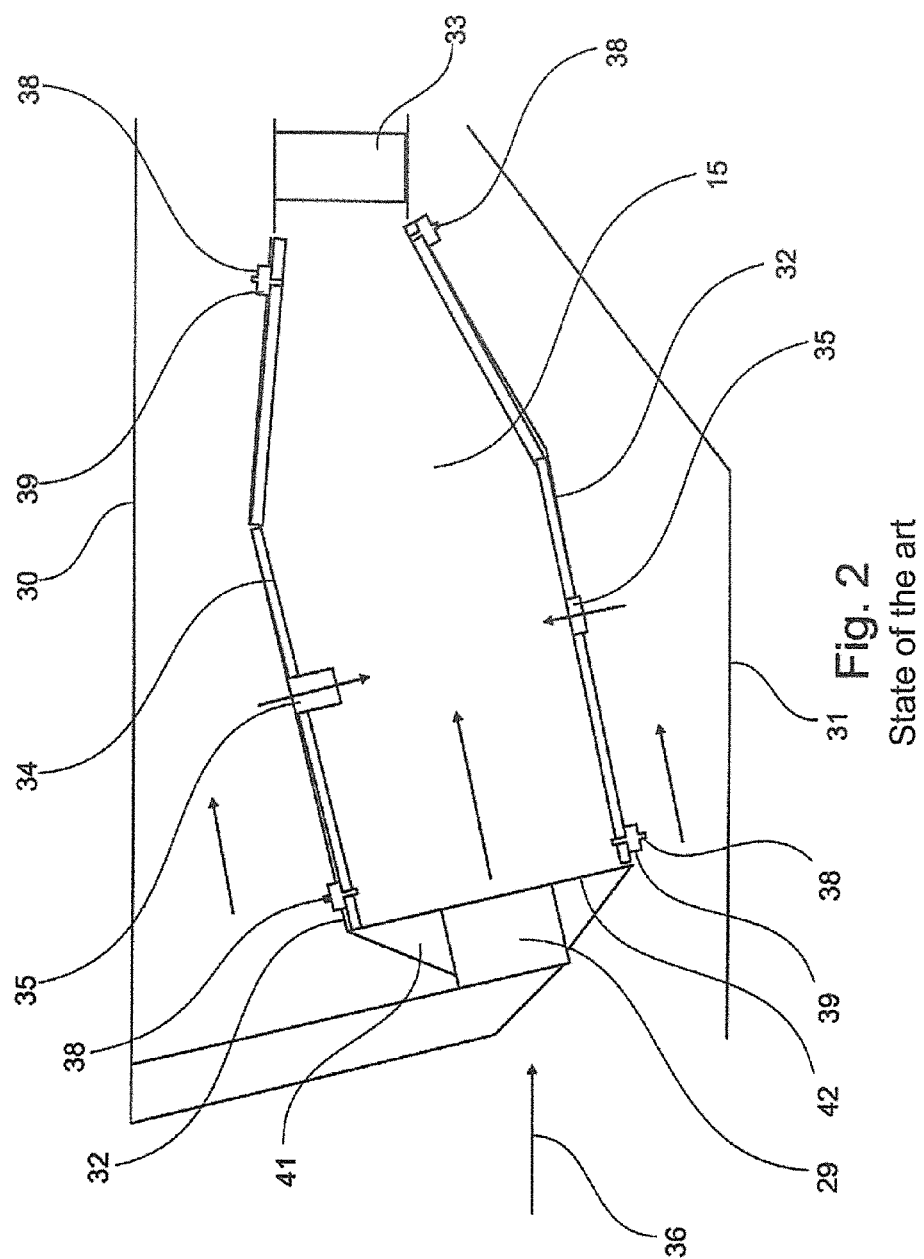
Figure 3:
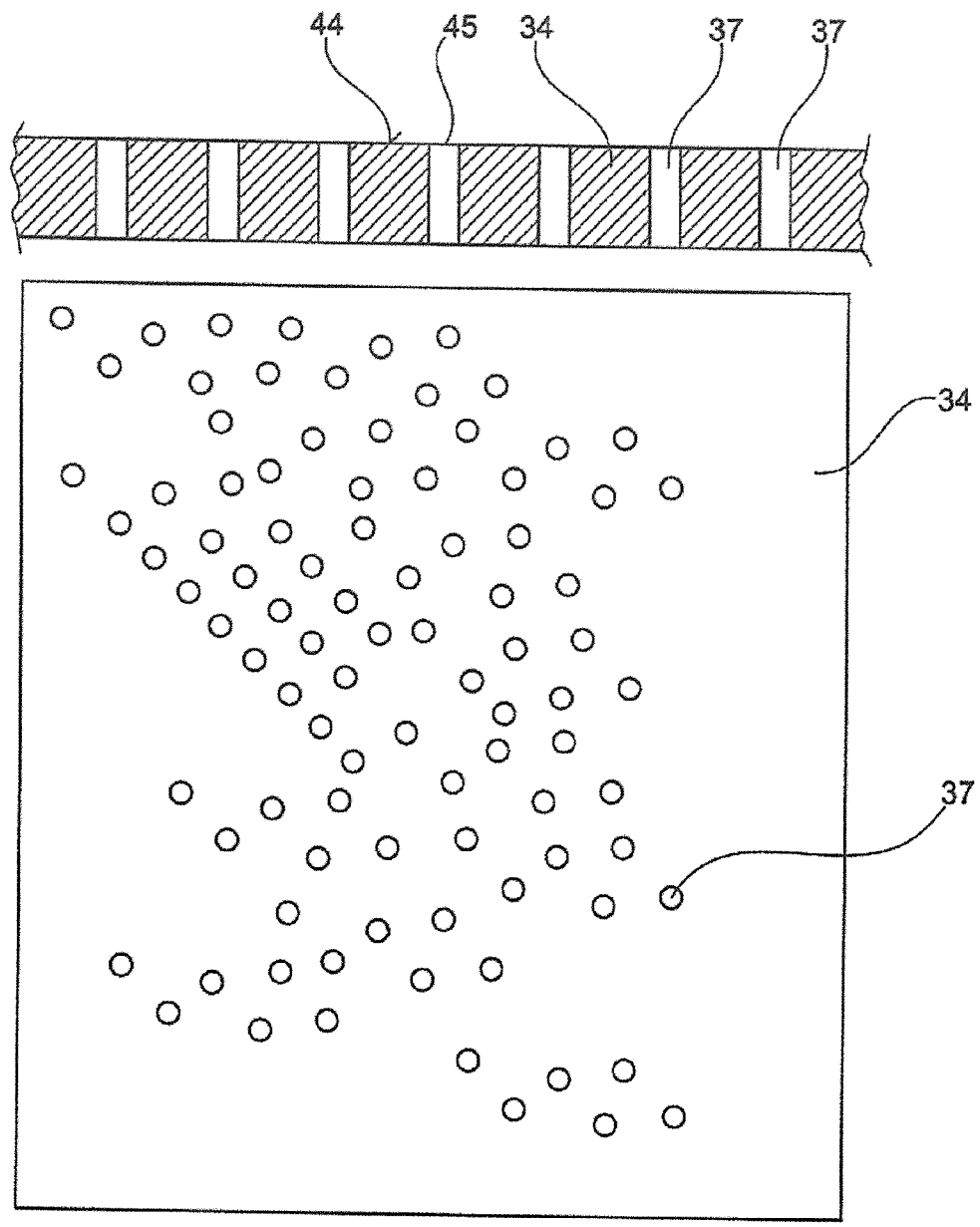
Figure 6:
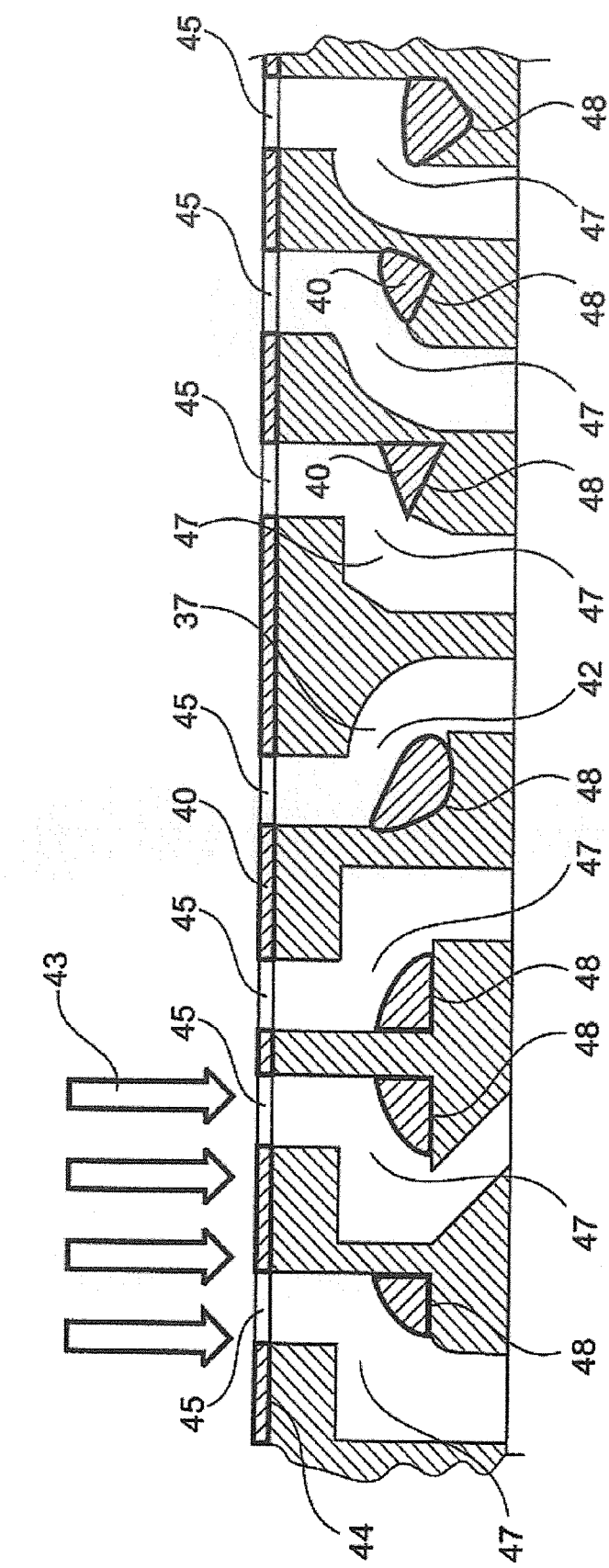

The present invention is described in the following in light of the accompanying drawing, showing exemplary embodiments. In the drawing, FIG. 1 shows a schematic representation of a gas-turbine engine in accordance with the present invention, FIG. 2 shows a schematic sectional side view of a combustion chamber to be used in accordance with the present invention, FIG. 3 shows a top view and a side view of a combustion chamber tile in accordance with the state of the art, FIG. 4 shows a side view, by analogy with FIG. 3, with coating applied, FIG. 5 shows a sectional view, by analogy with FIG. 4, with effusion cooling holes designed in accordance with the present invention, and FIG. 6 shows further exemplary embodiments of the present invention.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes, generally referred to as stator vanes 20 and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 schematically shows the structure of a combustion chamber 15 to be used in accordance with the present invention and known from the state of the art. This combustion chamber includes a fuel nozzle 29 as well as a combustion chamber outer casing 30 and a combustion chamber inner casing 31. Reference numeral 32 shows a combustion chamber wall. On the outlet area of the combustion chamber a turbine inlet guide vane row 33 is arranged. On the combustion chamber wall 32 combustion chamber tiles 34 are provided which can have admixing holes 35. The air flows in the inflow direction 36 through the combustion chamber. Cooling air is passed via effusion cooling holes 37 (see FIG. 3) through the combustion chamber tile 34. Set screws 38 with nuts 39 can be used for fastening the combustion chamber tile 34. As shown in FIG. 4, the combustion chamber tile 34 has a ceramic coating (surface coating) 40 which is sprayed onto the combustion chamber tile 34 (coating direction 43 according to FIG. 4).

FIG. 2 furthermore shows for the structure of the combustion chamber a combustion chamber head 41 and a heat shield 42.

FIGS. 5 and 6 each show in a schematic sectional view the structure of the combustion chamber tile in accordance with the present invention and analogously to FIG. 4. FIGS. 5 and 6 each show widely differing courses and cross-sectional shapes of the effusion cooling holes 37 in accordance with the invention, with the arrangement and representation of the effusion cooling holes only being intended to illustrate the invention, and not necessarily having the same spacings between effusion cooling holes and the same changing arrangement.

The result is that the surface 44 of the combustion chamber tile 34 is sprayed with a ceramic coating 40 in the coating direction 43, with the coating 40 being deposited on those areas of the combustion chamber tile 34 at which there are no effusion cooling holes 37. In the area of the inlet openings 45 of the effusion cooling holes, the material of the ceramic coating 40 enters the initially straight section 46 of the effusion cooling holes 37 perpendicular to the surface 44. The effusion cooling hole then has at its straight section 46 an angled or offset section 47. This offset section 47 has a widened cross-section of the effusion cooling hole 37. Furthermore, a shoulder 48 is formed which creates a deposition surface arranged substantially opposite to the inlet opening 45, as illustrated by the three exemplary embodiments on the left-hand side as per FIGS. 5 and 6. The coating material 40 entering through the inlet opening 45 is thus collected on the shoulder 48 and remains there, as is shown in FIGS. 5 and 6.

It is understood that the opening of the combustion chamber tile referred to as the inlet opening 45 is defined in respect of the deposition of the ceramic coating 40 as the inlet opening. The path of the cooling air is such that it exits at the coating inlet opening 45, since the ceramic coating 40 is arranged on the inside relative to the combustion chamber 15.

The shoulder 48 and/or the offset section 47 can also be designed such that a pocket or a concave area is formed, as is shown in particular by the three exemplary embodiments on the right-hand side of FIGS. 5 and 6. This leads to even more secure deposition of the coating material 40.

The remaining section of the effusion cooling holes in accordance with the invention can be as required, having a rounded or angular shape. The outlet of the effusion cooling hole to the non-coated side of the combustion chamber tile 34 can be designed perpendicular to this surface or at an angle thereto.

As explained in the foregoing, the ceramic coating 40 is located on that side of the combustion chamber tile 34 facing the interior of the combustion chamber 15, so that the throughflow direction with cooling air according to FIGS. 5 and 6 is from bottom to top. The cooling air thus exits through the inlet opening 45 and hence runs in the opposite direction to the coating direction 43 shown in FIGS. 5 and 6 with which the ceramic coating 40 is sprayed on.

LIST OF REFERENCE NUMERALS

1 Engine axis
10 Gas-turbine engine core engine
11 Air inlet
12 Fan
13 Intermediate-pressure compressor (compressor)
14 High-pressure compressor
15 Combustion chambers
16 High-pressure turbine
17 Intermediate-pressure turbine
18 Low-pressure turbine
19 Exhaust nozzle
20 Stator vanes
21 Engine casing
22 Compressor rotor blades 23 Stator vanes
24 Turbine blades
26 Compressor drum or disk
27 Turbine rotor hub
28 Exhaust cone
29 Fuel nozzle
30 Combustion chamber outer casing
31 Combustion chamber inner casing
32 Combustion chamber wall
33 Turbine inlet guide vane row
34 Combustion chamber tile
35 Admixing hole
36 Inflow direction
37 Effusion cooling hole
38 Set screw
39 Nut
40 Ceramic coating (surface coating)
41 Combustion chamber head
42 Heat shield
43 Coating dire ion
44 Surface
45 Inlet opening
46 Straight section
47 Offset/offset section
48 Shoulder

What is claimed is:

1. A combustion chamber tile of a gas turbine comprising:
a basic element including a first surface on a first side thereof and a second surface on a second side thereof opposite the first side and also including an effusion cooling hole extending through the basic element from the first surface to the second surface,
a ceramic surface coating applied to the first surface,
the effusion cooling hole including an inlet opening adjacent the first side of the basic element and extending substantially at a right angle to the first surface over part of a length of the effusion cooling hole,
the effusion cooling hole inside the basic element including a straight section adjacent the first side and then an offset section extending from the straight section toward the second side,
the effusion cooling hole including a shoulder opposite the inlet opening in an area of a beginning of the offset section, the shoulder being inclined away from the first surface in a direction away from the effusion cooling hole to form a recessed portion in the effusion cooling hole recessed away from the first surface for accumulating a portion of the ceramic surface coating.

2. The combustion chamber tile in accordance with claim 1, wherein the ceramic surface coating is a spray coating.

3. The combustion chamber tile in accordance with claim 1, wherein the basic element is an additive laser deposition produced element.

4. A method for manufacturing a combustion chamber tile of a gas turbine comprising:
providing:
a basic element including a first surface on a first side thereof and a second surface on a second side thereof opposite the first side and also including an effusion cooling hole extending through the basic element from the first surface to the second surface,
the effusion cooling hole including an inlet opening adjacent the first side of the basic element and extending substantially at a right angle to the first surface over part of a length of the effusion cooling hole,
the effusion cooling hole inside the basic element including a straight section adjacent the first side and then an offset section extending from the straight section toward the second side,
the effusion cooling hole including a shoulder opposite the inlet opening in an area of a beginning of the offset section, the shoulder being inclined away from the first surface in a direction away from the effusion cooling hole to form a recessed portion in the effusion cooling hole recessed away from the first surface, applying a ceramic surface coating applied to the first surface,
accumulating a portion of the ceramic surface coating entering the inlet opening in the recessed portion.

5. The method in accordance with claim 4, wand further comprising applying the ceramic coating by spraying.

6. The method in accordance with claim 4, and further comprising providing the basic element by an additive laser deposition method.

* * * * *